April 30, 1935.  G. W. VEALE  1,999,603
AUTOMOBILE HEATER
Filed Oct. 31, 1931  2 Sheets-Sheet 1

Inventor:
George W. Veale
Kwis Hudson & Kent
attys.

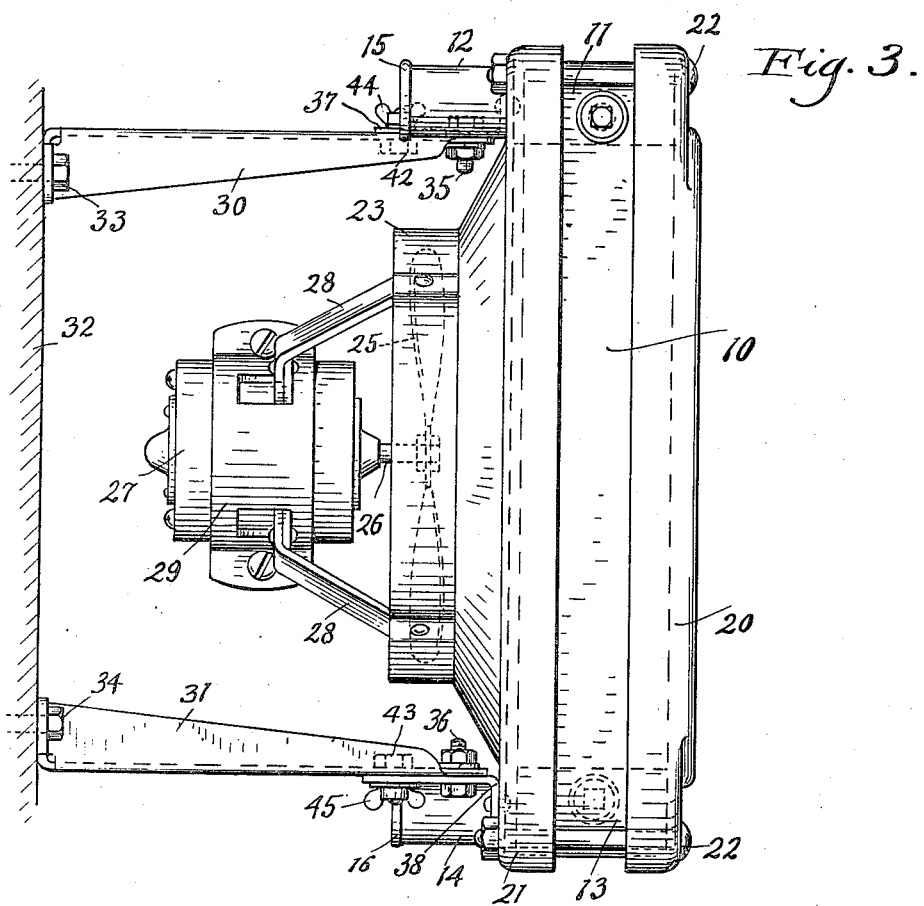
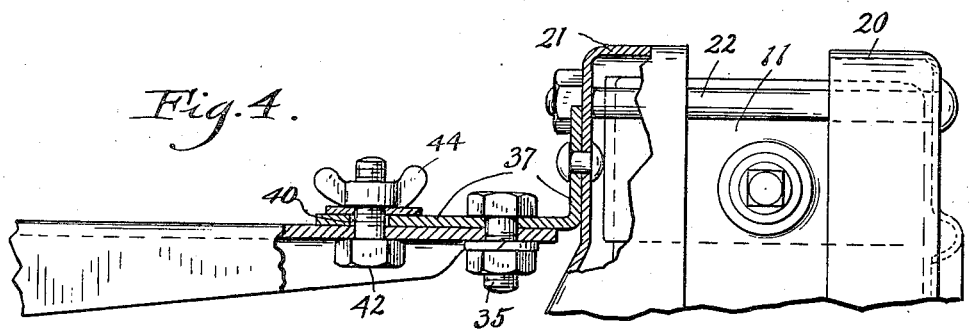

Patented Apr. 30, 1935

1,999,603

UNITED STATES PATENT OFFICE 1,999,603

AUTOMOBILE HEATER

George W. Veale, Cleveland Heights, Ohio, assignor to Eaton Manufacturing Company, Cleveland, Ohio, a corporation of Ohio Application October 31, 1931, Serial No. 572,420

5 Claims. (Cl. 257—137)

This invention relates to a support for an automobile heater of the type employing a radiator and a fan.

It has been customary to attach these heaters rigidly to the dash of the vehicle in which they are mounted, and to direct the heated air by means of vanes or deflectors fitted on the front of the radiator. A heater of this kind is usually mounted on the hight hand side of the dash and it is difficult to direct the heated air towards the floor or toward the driver where it is most desirable.

It is the object of the present invention to provide a support for a heater of this type which will permit the heater to be turned so as to direct the heated air in the direction desired.

Other objects of the invention and the features of novelty will be apparent from the following description taken in connection with the accompanying drawings of which, Figure 1 is a front view of one form of automobile heater employing the support provided by my invention;

Fig. 3 is a side view of the heater shown in Fig. 1; and

Fig. 4 is an enlarged view of one of the brackets with certain parts shown in section along the line 4—4 of Fig. 1.

Figure 1:
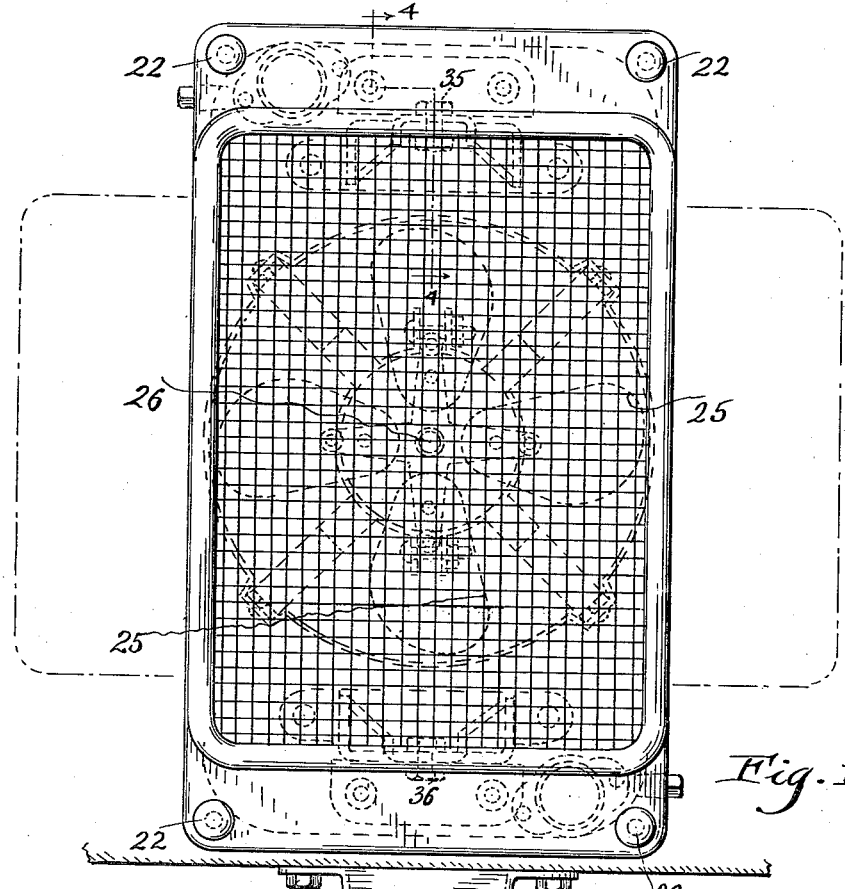
Figure 2:
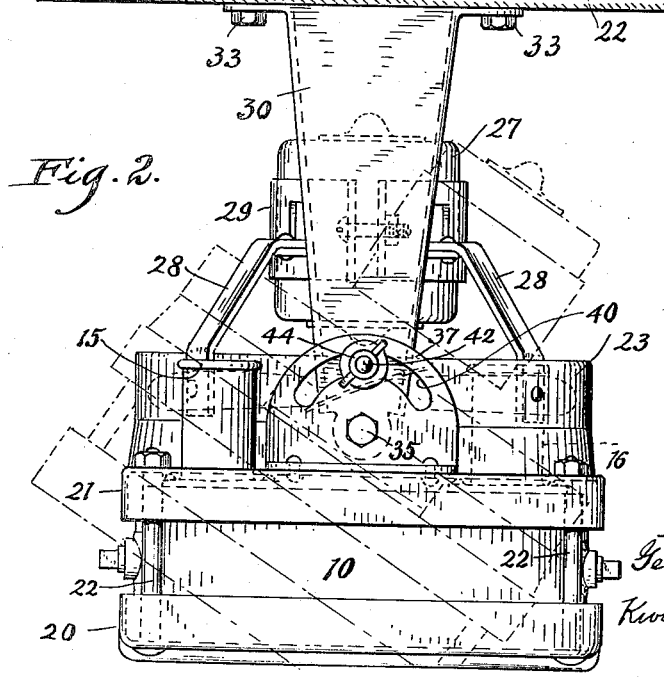
Fig. 2 is a top view of the heater shown in Fig. 1.

Referring more particularly to the drawings, the heater comprises a radiator core 10 having at one end a tank 11 which receives hot water from the engine through an inlet pipe 12. The core 10 also includes a lower tank 13 which discharges through an outlet pipe 14. The part of the core 10 between the tanks 11 and 13 may be of any desired construction which will permit passage of water from the tank 11 to the tank 13 and at the same time permit air to flow therethrough to be heated. The pipes 12 and 14 extend rearwardly from the core so as to receive a rubber hose or other flexible member which conducts the water to and from the engine. Annular projections 15 and 16 are provided adjacent the ends of the pipes 12 and 14 to assist in retaining the hose on the pipes and to prevent the hose pulling off when the radiator is turned.

The core 10 is supplied with a casing and as shown is composed of the sheet metal stampings 20 and 21 between which the core is clamped by means of the bolts 22, so that the casing serves as a support for the core. This construction permits the radiator core to be removed when necessary, without disturbing the fan or supporting brackets. The front half of the shell can be removed by taking out the bolts 22 and, when the hose are disconnected from the inlet and outlet pipes 12 and 14, the core can be lifted out, leaving the fan and the supporting structure in position. The rear section of the casing is flared inwardly and extends to an annular flange 23, the pipes 12 and 14 passing through apertures in this part of the casing. A fan 25 is mounted within the flange 23 and is carried by the shaft 26 of the motor 27. The motor and the fan are supported from the casing by means of the arms 28 which have their outer ends secured to the flange 23 while the inner ends of these arms are attached to the clamp 29 which supports the motor. It is clear that rotation of the fan will force air through the radiator.

Means are provided for supporting the radiator and the fan from the dash in such a manner that the radiator and the fan can be turned to direct the air flowing through the radiator. A pair of brackets or arms 30 and 31, adapted to be bolted to the dash by means of the bolts 33 and 34 are provided. These arms are preferably of channel cross-section, and are attached so that the side members are turned inward. Holes are provided adjacent the ends of the arms to receive the bolts 35 and 36 which serve as pivot pins. Attached to the rear of the casing are angular brackets 37 and 38 which are arranged to pivot on the bolts 35 and 36. The brackets 37 and 38 have curved slots as at 40 while bolts 42 and 43 extend through the slots and through the arms 30 and 31. When the wing nuts 44 and 45 are tightened the brackets 37 and 38 are rigidly held on the arms 30 and 31. When it is desired to turn the radiator, the nuts 44 and 45 are loosened, permitting the radiator to pivot on the bolts 35 and 36. The nuts can then be tightened so that the radiator will be held in the position selected.

It is clear that when the radiator is turned that the direction of the flow of the current of air from the radiator will be changed. If desired the radiator can be turned so that the heated air will be directed towards the driver of the car, or it may be turned so as to direct the heated air toward the other side of the vehicle. If desired, vanes or a deflector can be fitted to the front of the radiator to deflect the heated air towards the floor or into the upper part of the body of the vehicle. While the heater has been shown and described as being mounted so as to pivot on a vertical axis, which is the preferred mounting, it is equally within the scope of the invention to mount the heater so that it will pivot on a horizontal axis. The heater will then be in the position indicated by the dotted outline on Fig. 1.

While one embodiment of the invention has been illustrated and described in detail nevertheless it should be understood that the invention is not limited to the details disclosed, but instead it should be understood that the invention embraces such embodiments of the novel idea as fall within the scope of the appended claims, it being obvious that various changes may be made in the disclosed embodiment without departing from the spirit of the invention.

Having thus described my invention, I claim:

1. In apparatus of the class described, the combination of a shell member having openings in its opposite sides, a motor driven fan rigidly supported on said member in association with one of said openings, a radiator core fitted into the other of said openings, means for detachably clamping said core in said member, a pair of brackets adapted to be secured to the dash of an automobile and arranged on opposite sides of said motor, a pair of ears on said member and engaging said brackets, means pivotally connecting said ears with said brackets and permitting said member to be adjusted to different angular positions with respect to said dash, and clamping means engaging one of said brackets and its associated ear to secure said member in any position to which it is adjusted.

2. In apparatus of the class described, the combination of a shell member having openings in its opposite sides, a motor driven fan rigidly supported on said member in association with one of said openings, a radiator core fitted into the other of said openings, means for detachably clamping said core in said member, a pair of brackets adapted to be secured to the dash of an automobile and arranged on opposite sides of said motor, a pair of ears on said member and engaging said brackets, means pivotally connecting said ears with said brackets and permitting said member to be adjusted to different angular positions with respect to said dash, and clamping means separate from said pivotal means for securing said member in any position to which it is adjusted.

3. In apparatus of the class described, the combination of a shell having members engaging opposite faces of a radiator core, said shell having openings in its opposite sides, one of said openings being surrounded by an annular flange, a motor driven fan rigidly supported within said flange on one of said shell members in association with one of said openings, one of said shell members having apertures therein through which the inlet and outlet pipes for the radiator core extend, a pair of brackets adapted to be secured to the dash of an automobile, a pair of ears secured on one of said shell members and arranged on opposite sides of said motor, said ears being pivotally secured to said brackets.

4. In apparatus of the class described, the combination of an automobile heater having spaced upper and lower arms connected respectively to the top and bottom portions of the heater and extending rearwardly therefrom, supporting means comprising upper and lower bracket arms adapted to be carried by the dashboard and having portions engaging the first mentioned upper and lower arms, pivot means connecting together said upper arms and said lower arms in pairs, a motor-driven fan rigidly attached to said heater, means for clamping one of said pairs of arms together to resist free swinging movement of the heater on said pivot means, and upper and lower connections to said heater independent of all of said arms and through which the heating medium is supplied to and discharged from the heater.

5. In apparatus of the class described, the combination of an automobile heater having spaced upper and lower arms connected respectively to the top and bottom portions of the heater and extending rearwardly therefrom, supporting means comprising upper and lower bracket arms adapted to be carried by the dashboard and having portions engaging the first mentioned upper and lower arms, pivot means connecting together said upper arms and said lower arms in pairs, a motor-driven fan rigidly attached to said heater, means spaced from said pivot means for clamping one of said pairs of arms together to resist free swinging movement of the heater on said pivot means, and upper and lower connections to said heater independent of all of said arms and through which the heating medium is supplied to and discharged from the heater.

GEORGE W. VEALE.